Patented Aug. 20, 1940

2,212,151

UNITED STATES PATENT OFFICE 2,212,151

HYDROGENATION OF POLYMERIC ACYLOINS

Donald Drake Coffman and Burt Froment Faris, Wilmington, Del., assignors to E. I. du Pont de Nemours & Company, Wilmington, Del., a corporation of Delaware No Drawing. Application August 17, 1938, Serial No. 225,442

6 Claims. (Cl. 260—635)

This invention relates to organic compounds and more particularly to polyhydric aliphatic alcohols.

In copending application of Virgil L. Hansley, Serial Number 225,443, filed of even date herewith, the preparation of cyclic and polymeric acyloins of long open chain dicarboxylic acids is disclosed and claimed. The present application relates to the saturated secondary polyhydric alcohols obtained by hydrogenation of these acyloins, and to their preparation.

The present invention has as an object the preparation of new compositions of matter, as a further object the preparation of perfume constituents, and as a further object the preparation of new resin intermediates. Other objects will appear hereinafter.

These objects are accomplished by the following invention which comprises the hydrogenation products, alcoholic in nature, of acyloins of open chain dicarboxylic acids having a radical length of at least seven and methods, given in further detail below, for producing the same.

The term "radical length" refers to the length of the chain between and including the carboxyl carbons of the dicarboxylic acids or the carbinol carbons of the alcohols.

Cyclic glycols having various numbers of annular atoms are known. Due apparently to certain space relationships, on which Baeyer's Strain Theory has been based, those having rings of five or six atoms are easy to prepare, while closure of a larger or smaller ring is relatively difficult to effect. Of the cyclic glycols of the prior art, that which is perhaps the most closely related to those of the present invention is the 1,2-dimethylcycloheptane-1,2-diol of Perkin and Kipping, Chem. News 60, 267 (1889). This glycol, however, is not obtainable by the method of the present application; moreover, inasmuch as both alcohol groups are tertiary, it is quite unlike the present products, in which both alcohol groups are secondary, in properties and reactions. Cyclohexane-1,2-diol is also known, but it has a 6-ring and is readily obtained, as by hydrolysis of cyclohexene oxide.

Several types of polymers containing alcohol groups are known, but linear open chain saturated polymeric alcohols, in which the alcohol groups are all secondary and arranged in the peculiar fashion of those in the present products, are new.

As already indicated, the acyloins used as starting materials in the present invention are obtainable as described in Hansley Serial Number 225,443, filed of even date herewith. In that process a neutral monohydric alcohol ester of an open chain dicarboxylic acid of radical length at least seven is condensed with itself by heating and stirring with an alkali metal in the presence of an inert solvent and preferably at a temperature above the melting point of the alkali metal, the condensation being continued until the reaction mixture can no longer be stirred or pumped through a colloid mill, which usually requires 6–8 hours. The mixture is then treated with an alcohol, after which it is washed with water or dilute aqueous acid. The acyloins formed are then separated by fractional vacuum distillation, or extraction with appropriately chosen solvents, or both.

In carrying out the process of the present invention, the acyloin is hydrogenated in the presence of a suitable solvent, such as toluene, and of a suitable hydrogenation catalyst, such as finely divided nickel, at a temperature of preferably about 100° C. and at a pressure of preferably about 200 atmospheres. When substantially no more hydrogen is absorbed, the hydrogenation is stopped, the vessel cooled and opened, the catalyst filtered off, and the product isolated in any suitable manner, as by concentrating the filtrate and causing the alcohol to crystallize. The following examples, in which parts are by weight, illustrate specific embodiments of this process.

EXAMPLE I

Cyclodecane-1,2-diol

Six (6) parts of the cyclic acyloin of sebacic acid obtained according to Example I of Hansley, Serial Number 225,443, is placed in an autoclave with 87 parts of toluene and 5 parts of finely divided nickel catalyst. The mixture is heated to 110° C. and subjected to a hydrogen pressure of 200 atmospheres with constant agitation. After hydrogen is no longer absorbed, the autoclave is cooled and opened, and the catalyst filtered off. The solution is then concentrated to about one-fourth its volume by heating in a vacuum, and is subsequently cooled. Cyclodecane-1,2-diol of the formula

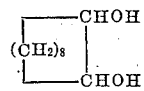

separates as a white crystalline product melting at 136° C. The yield is usually at least 50%. In one run, as described, the product after crystallization from benzene was found to have a molecular weight of 179, a carbon content of 69.62%, and a hydrogen content of 11.76%. The calculated values are 172, 69.77%, and 11.63%, respectively.

EXAMPLE II

Cyclooctadecane-1,2-diol

Four (4) parts of the cyclic acyloin of octadecamethylenedicarboxylic acid, obtained according to Example II of Hansley Serial Number 225,443, is dissolved in 85 parts of dry toluene and hydrogenated at 110° C. and 200 atmospheres in the presence of finely divided nickel until no more hydrogen is absorbed. The catalyst is then filtered off and the solution subjected to vacuum fractionation. The compound cyclooctadecane-1,2-diol, of the formula

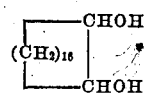

passes over in about 50% yield at 213-217/7 mm. It may be further purified by crystallization from petroleum ether, after which it melts at 103-5° C. Upon analysis it has carbon and hydrogen contents of 75.92% and 12.88% as compared to calculated values of 75.98% and 12.77%, respectively.

EXAMPLE III

Hydrogenated polyacyloin of sebacic acid

Sixty (60) parts of the polyacyloin of sebacic acid, being the non-volatile residue obtained from distillation of the condensation product of Example I of Hansley Serial Number 225,443, is dissolved in 215 parts of toluene and the solution placed in an autoclave with 10 parts of finely divided nickel catalyst. The autoclave is sealed, and the contents heated to 110° C. while being subjected to a hydrogen pressure of 150–200 atmospheres. When hydrogen is no longer absorbed, the autoclave is cooled and opened, the catalyst removed by filtration, and the solvent distilled off by heating in a low vacuum. Upon decreasing the pressure to about 5 mm. and increasing the bath temperature to about 275° C., 5 parts of a low polymer distills, and about 55 parts of a high polymer remains as a non-volatile viscous, sticky, translucent residue. These polymeric glycols are linear open chain polymers of the formula

where $x$ is the number of recurring structural units. Analysis substantiates this composition, the carbon and hydrogen contents being, respectively, 70.3% and 10.8%. The high polymer has a molecular weight of about 3000.

Acyloins, either cyclic monomeric acyloins or low or high molecular weight linear polyacyloins, of other open chain aliphatic dicarboxylic acids of radical length at least seven may be similarly hydrogenated. The products from the cyclic monomers are saturated cyclic 1,2-glycols. The products from the polyacyloins are saturated linear polymeric alcohols.

The present invention is generic to aliphatic polyhydric alcohols characterized by the presence of a —CHOH—CHOH— grouping attached by at least one of its valences to a bivalent aliphatic radical having a chain length between its valences of at least five. When the remaining valence of the —CHOH—CHOH— grouping is attached to the remaining valence of the bivalent aliphatic radical, the polyhydric aliphatic alcohol is a monocyclic, monomeric, aliphatic, vicinal, secondary glycol of at least seven annular atoms, of the formula

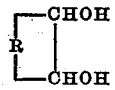

wherein R is the bivalent aliphatic radical having a chain length between valences of at least five. R may be any bivalent open chain saturated organic radical and is preferably saturated hydrocarbon and preferably polymethylene to which subgenera the invention is obviously likewise generic. It is obvious that R though forming part of a ring in the cyclic monomer is itself an open chain bivalent radical. When the second valence of the —CHOH—CHOH— grouping is attached to another unit of the bivalent aliphatic organic radical, the polyhydric aliphatic alcohol is an acyclic linear polyhydric alcohol of the formula [—CHOH—CHOH—R—]$_x$ wherein R is as above and $x$ is the number of recurring structural units in the molecule. It is to be noted that the structural unit in the cyclic monomer and the linear polymer is the same, i. e., —CHOH—CHOH—R—. The structural unit is the least common divisor of the molecule, i. e., the unit which taken once for the monomer or a plurality of times for the polymer makes up the structure of the product. It is to be noted that these polymeric alcohols are characterized by containing a secondary alcohol group on each of two adjacent carbon atoms, which pair of carbons is then separated from the next and similar pair by a long open chain having no alcohol groups. To our knowledge, polymeric alcohols of this peculiar structure have never before been prepared.

Results similar to those of the examples may be obtained by hydrogenating in an analogous manner the cyclic monomeric and low or high molecular weight, open chain, polymeric acyloins of any acyclic dicarboxylic acid of radical length at least seven, among them those of the following acids: sebacic, hexadecamethylenedicarboxylic, azelaic, suberic, brassylic, pimelic, γ-ketopimelic, dodecamethylenedicarboxylic, tridecamethylenedicarboxylic, and tetradecamethylenedicarboxylic. The hydrogenated acyloins of acyclic hydrocarbon dicarboxylic acids, i. e., those in which the two carboxyls are attached to a divalent acyclic hydrocarbon radical, particularly polymethylene dicarboxylic acids, form a preferred embodiment of this invention.

Toluene is the preferred solvent for the hydrogenation, but any other liquid which is a solvent for the acyloin and is chemically inert toward reactants and products under the conditions of operation may be utilized. Suitable specific solvents, in addition to toluene, include the following: benzene, xylene, tetrahydronaphthalene, decahydronaphthalene, butyl acetate, ethyl acetate dimethylformamide, di-n-butyl ether, and dioxan. The concentration of acyloin in the solvent seems substantially immaterial so long as enough is used to permit easy mixing.

Similarly, while the invention has been illustrated only with nickel catalysts, other common hydrogenation catalysts will give significant results, among them cobalt, platinum, copper chromite, nickel chromite, and the so-called multiple chromite catalysts generally. Any catalyst, massive or supported, which is known to effect saturation of ethylenic double bonds, will be satisfactory. The pressure may range from around 20 atmospheres up to 400 atmospheres and even higher, depending on the strength of the equipment, although there is apparently nothing to be gained by the use of very high pressures. The temperature may be as low as 25° C. but in practice will usually range, for best results, from around 70° C. to 160° C. The hydrogenation may be a batch or continuous process.

The cyclic glycols of the present invention are useful as perfume constituents. Those having from 14 to 16 annular atoms have the more pleasant and persistent odors. The polymeric alcohols are useful as waxes and as intermediates for alkyd and acetal-type resins.

The above descriptions and examples are only illustrative. Any modification which conforms to the spirit of the invention is intended to be included within the claims.

We claim:

1. A polymeric, acyclic, saturated hydrogenated acyloin of an open chain dicarboxylic acid having a chain of atoms between and including the carboxyl carbons of at least seven, said product being characterized by the presence of a recurring structural unit consisting of a CHOH—CHOH group attached by one valence to a divalent aliphatic radical having a chain of at least five atoms contiguous with the carbinol carbons.

2. A polymeric, acyclic saturated hydrogenated acyloin of an open chain hydrocarbon dicarboxylic acid having a chain of atoms between and including the carboxyl carbons of at least seven, said product being characterized by the presence of a recurring structural unit consisting of a CHOH—CHOH group attached by one valence to a divalent aliphatic hydrocarbon radical having a chain of at least five atoms contiguous with the carbinol carbons.

3. A polymeric, acyclic saturated hydrogenated acyloin of a polymethylenedicarboxylic acid having a chain of atoms between and including the carboxyl carbons of at least seven, said product being characterized by the presence of a recurring structural unit consisting of a

CHOH—CHOH group attached by one valence to a polymethylene radical having a chain of at least five atoms contiguous with the carbinol carbons.

4. Process which comprises hydrogenating an acyclic polymeric acyloin of an open chain dicarboxylic acid of chain length, between and including the carboxyl carbons of at least seven atoms.

5. Process which comprises bringing an acyclic polymeric acyloin of an open chain dicarboxylic acid of chain length, between and including the carboxyl carbons of at least seven atoms into contact with hydrogen in the presence of a hydrogenation catalyst and of an inert solvent for the acyloin, at a temperature of 25° C. to 160° C., and at a pressure of 20 to 400 atmospheres, and continuing the process until substantially no more hydrogen is absorbed.

6. A polymeric, acyclic, saturated, hydrogenated acyloin of sebacic acid, said product having the formula $[-CHOH-CHOH-(CH_2)_8-]_x$ wherein $x$ is the number of recurring structural units in the polymer.

DONALD DRAKE COFFMAN.
BURT FROMENT FARIS.